United States Patent [19]

Fazioli

[11] Patent Number: 4,651,218
[45] Date of Patent: Mar. 17, 1987

[54] METHOD AND APPARATUS FOR MOUNTING A CRT IN A DYNAMIC (VIBRATION AND SHOCK PRONE) ENVIRONMENT

[75] Inventor: Dan J. Fazioli, Seminole, Fla.

[73] Assignee: Smiths Industries Aerospace & Defense Systems Inc., Malvern, Pa.

[21] Appl. No.: 726,632

[22] Filed: Apr. 24, 1985

[51] Int. Cl.$^4$ ............................................. H04N 5/645
[52] U.S. Cl. .................................... 358/248; 358/246; 313/482
[58] Field of Search ............................... 358/248, 246; 220/2.1 A, 2.3; 248/315; 313/482

[56] References Cited

U.S. PATENT DOCUMENTS 3,398,238  8/1968  Siebold ................................. 358/248
4,415,932 11/1983  Rogers ................................. 358/248

*Primary Examiner*—James J. Groody
*Assistant Examiner*—Edward L. Coles
*Attorney, Agent, or Firm*—Stiefel, Gross, Kurland & Pavane

[57] ABSTRACT

A method and apparatus for mounting a video type display tube (20) in a given dynamic mechanical environment employs a plurality of mounting members (56, 56a, 56b, 56c) which are secured to the periphery of the tube (20) at four corresponding predetermined static and dynamic reaction points (1,2,3,4) where substantially minimum bending and torsional stresses occur for the mounted tube (20). Elastomeric grommets (53,54,52a,54a,52b,54b,52c,54c) having a predetermined dynamic stiffness over a desired temperature range capable of attenuating the associated dynamic G forces of the dynamic mechanical vibration and dynamic mechanical shock in the given dynamic mechanical environment are mounted in opposing pairs in an aperture (60) in each of the respective bracket members (56, 56a,56b,56c). A fastener (40,42,44,46) is threaded through each of the mounted grommet pairs (52-54, 52a-54a, 52b-54b, 52c-54c) at the four static and dynamic reaction points and secured to the chassis (22) through respective apertures 24,26,28,30) therein, with the static and dynamic reaction points (1,2,3,4) forming the four mounting points for the tube (20) while substantially minimizing the bending and torsional forces on the tube (20) and the dynamic effects of the G forces on the tube (20).

33 Claims, 4 Drawing Figures

MOUNTING POINT REACTIONS

METHOD AND APPARATUS FOR MOUNTING A CRT IN A DYNAMIC (VIBRATION AND SHOCK PRONE) ENVIRONMENT

TECHNICAL FIELD

The present invention relates to methods and apparatus for mounting video type display tubes, such as a monochrome or multicolor CRT, in a dynamic prone environment, such as may exist in military aircraft, on board a vessel or in a vibration prone ground environment.

BACKGROUND ART

The use of various types of vibration damping or protective methods for cathode ray tubes and other types of vacuum tubes to protect them from shock and vibration are well known in the art. One such well known prior art protective method which has been employed in military/commercial aircraft for use in potentially vibration prone environments involves encapsulating the cathode ray tube in a costly resilient foam liner. Apart from the relatively high cost of such an encapsulation approach, it is difficult to salvage parts of the tube, which by itself is costly, and the structure thus becomes an expensive throw-away item. One such prior art approach involving an enclosure for a portion of the cathode ray tube is disclosed in U.S. Pat. No. 2,354,661 which also employs a resilient mount at the center of gravity of the tube to which the tube is threadedly secured. Such an arrangement is complex and requires a special tube construction, thereby increasing cost, as opposed to the efficient mounting arrangemnet of the present invention. Apart from this prior art arrangement, the use of a resilient mount for a cathode ray tube is well known in the prior art, such as disclosed in U.S. Pat. Nos. 2,440,260; 2,165,779; 2,451,832 and 2,047,020, although none of these prior art arrangments is believed to be as efficient as the present invention for a dynamic prone environment capable of exposure to high shock and vibration, such as, for example, in a military aircraft. In addition, although vibration mounting of vacuum tubes per se was known, such as disclosed in U.S. Pat. Nos. 2,599,003; 2,428,928; 2,453,003; 2,119,102; 3,308,521; and 3,265,919, none of the prior art known to applicant is believed to provide an efficient, cost effective approach for mounting video type display tubes in dynamic prone environments where extreme shock or vibration may occur, such as the aformentioned military aircraft, resulting in considerable cost just to provide sufficient protection for the tube in such an environment. Of course, although military aircraft are referred to by way of example, the principles of the present invention, which are believed to overcome the disadvantages of the prior art, may be applicable to any vibration and shock prone environment in which the benefits of the present invention are desired, whether on land, sea or in the air.

DISCLOSURE OF THE INVENTION

An improved video type display tube appartus comprising a video type display tube, such as a cathode ray tube, which is mounted in an equipment enclosure for use in a dynamic prone environment capable of subjecting the mounted CRT to both dynamic forces, such as due to bending and torsional stresses, and dynamic forces, such as the associated dynamic G forces of the vibration and shock prone environment, employs a plurality of mounting bracket members disposed about the outer surface or periphery of the tube where substantially minimum bending and torsional stresses occur for the mounted tube in the dynamic prone environment, and elastomeric grommets disposed in apertures in the mounting members through which fasteners are fed to secure the tube to the equipment enclosure. The grommets are selected to have a predetermined dynamic stiffness capable of attenuating the associated dynamic G forces of the environment. Preferably, four mounting members are employed which are structurally bonded to the tube at reaction points which are determined based on the characteristics of the tube and the dynamic prone environment which produces the bending and torsional stresses on the tube, and are then further secured in place by an implosion band used for the tube. The grommets are preferably mounted in pairs in the mounting member aperture, with one grommet inserted in each end of the aperture. The stiffness of the elastomeric grommets required for the desired dynamic prone environment may also be determined based on the characteristics of the tube and the environment which produce the dynamic G forces on the tube. Thus, a four point mounting is provided for the tube which substantially minimizes the bending and torsional forces on the tube and the dynamic effects of the G forces on the tube in an efficient, cost effective, assembly.

BEST MODE FOR CARRYING OUT THE INVENTION

Figure 1:
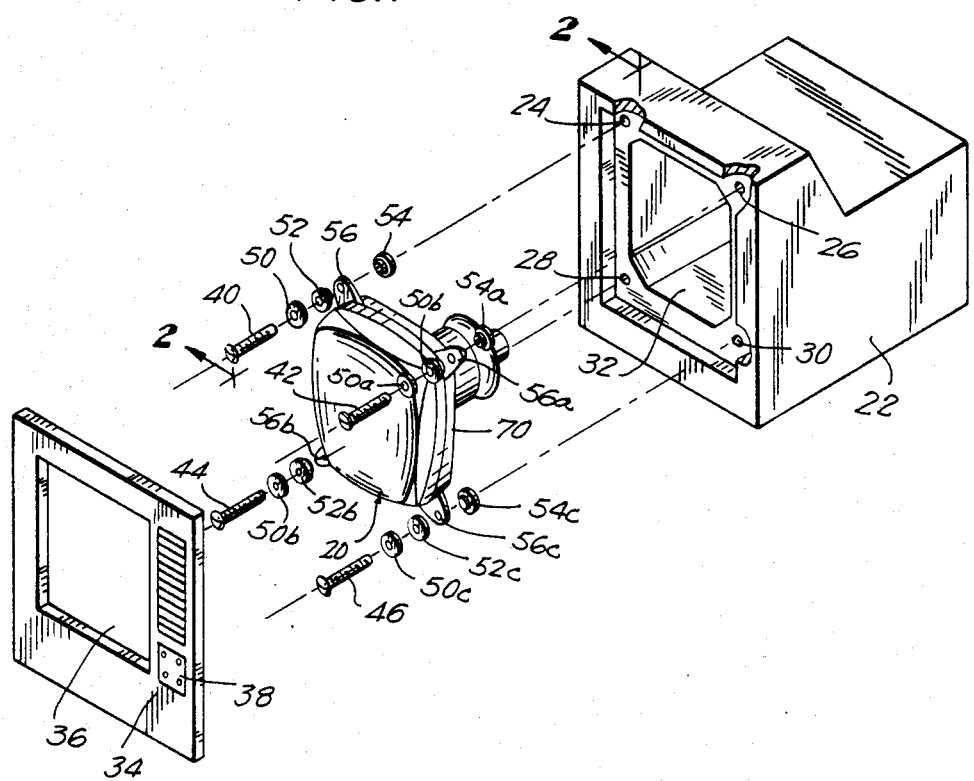
FIG. 1 is an exploded perspective view illustrative of an embodiment for mounting a video display tube in an equipment enclosure therefor in a dynamic prone environment in accordance with the presently preferred method of the present invention.

Referring now to the drawings in detail, and initially to FIG. 1, an exploded perspective view illustrative of an emboidment for mounting a video display tube 20, such as a conventional cathode ray tube, in a custom or conventional equipment enclosure 22 therefor, such as for a conventional aircraft video instrument, in a dynamic prone environment subject to shock and vibration, is shown. The details of the chassis or equipment enclosure 22 are not shown since they form no part of the present invention except for the location of four mounting holes 24, 26, 28 and 30 at the front of the chassis 22 which contains a large opening 32 into which the cathode ray tube 20 is inserted for connection to the associated components which are used to conventionally drive the cathode ray tube and provide a conventional video display thereon. The front bezel 34 of the equipment illustrated in FIG. 1 is also shown and this bezel 34 conventionally covers the cathode ray tube 20 when it is mounted in the chassis 22 to complete the housing for the instrument and conventionally contains an opening 36 for the cathode ray tube 20 to be viewed therethrough as well as a location for the controls 38 for the instrument. The bezel 34 is conventionally attached to the chassis 22 and need not be described in any further detail. The wiring for the cathode ray tube 20 and other connections not forming part of the present invention are omitted for purposes of clarity.

As is shown and preferred in FIGS. 1, 2, 3A and 3B, the cathode ray tube 20 is preferably mounted to the chassis 22 by means of four conventional fasteners 40, 42, 44 and 46, which are each inserted through a mounting arrangement comprising a conventional flat washer 50, a pair of elastomeric grommets 52 and 54 and a mounting bracket 56 and through a corresponding chassis aperture such as aperture 24 for fastener 40 by way of example, for connection to the chassis 22. The same type of arrangement is preferably provided for each of the fasteners 42, 44 and 46 for insertion into the other respective apertures 26, 28 and 30 of the chassis 22 with each of the respective components of the mounting arrangement being given the letters "a" for fastener 42, "b" for fastener 44, and "c" for fastener 46 in FIG. 1. With respect to grommet 54b associated with fastener 44, this grommet is not visible in the view of FIG. 1 although it is present in the structure illustrated in FIG. 1.

Figure 2:
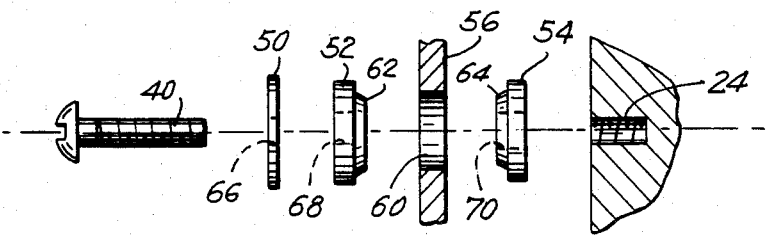
FIG. 2 is an enlarged exploded fragmentary sectional view, taken along line 2—2 of FIG. 1, of a typical one of the mounting arrangements in FIG. 1.
Figure 3A:
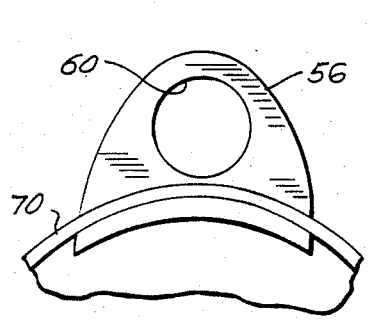
FIGS. 3A and 3B are enlarged fragmentary views of a typical mounting bracket employed in FIGS. 1 and 2, with FIG. 3A being a front view and FIG. 3B being a side view of FIG. 3A, partially in section.
Figure 3B:
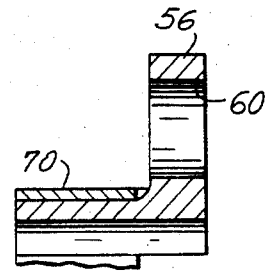

FIG. 2 is an enlarged exploded fragmentary sectional view taken alone line 2—2 of FIG. 1 which illustrates a typical one of the mounting arrangements in FIG. 1, particularly the mounting arrangement associated with fastener 40 by way of example. As can be seen in FIG. 2, preferably a portion 62,64 of the associated grommets 52 and 54 is slightly tapered for ease of insertion into the central aperture 60 in the mounting bracket 56 and is preferably sized to insure a snug fit therein, with the insertion portion 62 of grommet 52 and 64 of grommet 54 preferably being sized so as to provide a continuous grommet lined path through aperture 60 when both are properly inserted in the mounting bracket member 56 with portion 62 being inserted through one end of aperture 60 and with portion 64 being inserted through the other end of aperture 60. As further shown and preferred in FIG. 2, each of the grommets 52,54 also has an aperture therethrough. Thus, as shown in FIG. 2, aperture 60 in mounting bracket member 56 is sized to enable the insertion of the insertion portions 62 and 64 of grommets 52 and 54 therein, and the respective apertures 66, 68 and 70, respectively, of washer 50, grommet 52, and grommet 54 are sized to enable the fastener 40 to pass therethrough into aperture 24 in the chassis 22 in the assembled mounting arrangement. Although the mounting arrangement in FIG. 2 has been described with respect to fastener 40, preferably the same arrangement is utilized with respect to fasteners 42, 44 and 46.

As will be described in greater detail hereinafter, preferably each of the mounting bracket members 56, 56a, 56b and 56c, are conventionally structurally bonded to the periphery of the cathode ray tube 20 at four respective mounting points (1,2,3,4) which are determined as the location where substantially the minimum bending and torsional stresses occur on the cathode ray tube 20 in the desired dynamic prone environment. Preferably after the structural bonding of the mounting bracket members 56, 56a, 56b and 56c at these four mounting points, a conventional implosion band 70 normally employed with the conventional cathode ray tube 20 is placed on the cathode ray tube 20 at the location of the mounting bracket members 56, 56a, 56b and 56c over these mounting bracket members 56, 56a, 56b, 56c to further secure them in place at the respective mounting points (1,2,3,4—FIG. 4) while also serving as the implosion band 70.

The elastomeric grommets 52, 54, 52a, 54a, 52b, 54b, 52c, 54c, are all preferably selected based on a determination of the predetermined dynamic stiffness desired which is capable of attenuating the associated dynamic G forces of the selected vibration and shock prone environment in which the cathode ray tube 20 is to be utilized over a desired temperature range. The elastomeric grommets 52, 54, by way of example, are conventional grommets which are selected as previously mentioned based on this determination of dynamic stiffness. As will be described in greater detail hereinafter, this dynamic stiffness is preferably selected to enable the grommets 52, 54, by way of example, to maintain their stiffness over a desired temperature range which is to be experienced by the selected dynamic prone environment. After the appropriate grommets 52, 56, by way of example, are selected they are preferably inserted in the appropriate mounting bracket member aperture 60 disposed at each of the previously determined four mounting points around the periphery of the cathode ray tube 20. The bolts are then inserted through the respective washers and the grommet-mounting bracket sandwich arrangement and connected to the chassis 22 through the respective apertures 24, 26, 28 and 30 in a mounting arrangement which substantially minimizes the effects of the bending and torsional forces on the cathode ray tube 20 and the dynamic effects of the G forces on the cathode ray tube 20 in an efficient, cost-effective, assembly.

Figure 4:
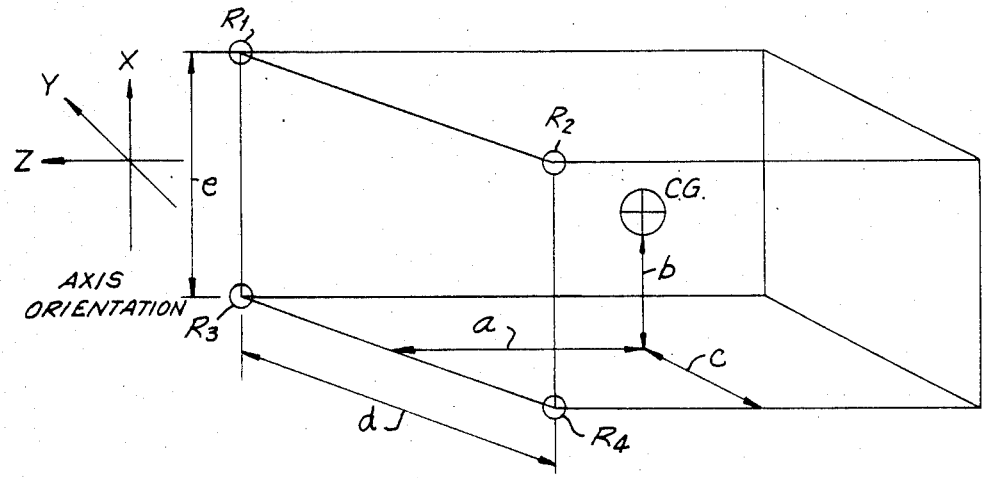
FIG. 4 is an illustration of a force diagram useful in determining the four mounting point reactions in accordance with the presently preferred method of the present invention.

In order to summarize the presently preferred method of the present invention for achieving this presently preferred mounting arrangement, brief reference is made to FIG. 4 which is a force diagram for determining the four mounting point reactions, labeled 1, 2, 3, and 4 in FIG. 4 but which respectively correspond to the location of mounting bracket members 56, 56a, 56b and 56c in FIG. 1. The initials CG in FIG. 4 are representative of the center of gravity of the cathode ray tube 20. In practicing the presently preferred method of the present invention, the four mounting reaction points at which the mounting bracket members are located on the cathode ray tube 20 are preferably calculated in accordance with a conventional equation illustrated below in which Z refers to the forward direction, Y refers to the side or lateral direction, and X refers to the up direction, with W referring to the total weight of the tube assembly 20 in pounds and g referring to the acceleration force. The following set of equations initially refer to the static/dynamic condition in which the forces are acting alone.

FORWARD-AFT (Z—Z AXIS)

$$R_1 = -\frac{Wgb}{e}\left(1 - \frac{d-c}{d}\right)$$

$$R_2 = -\frac{Wgb}{de}(d-c)$$

$$R_3 = -Wg\left(1 - \frac{d-c}{d}\right)\left(1 - \frac{b}{e}\right)$$

$$R_4 = -\frac{Wg}{d}(d-c)\left(1 - \frac{b}{e}\right)$$

All Forces in Z-Direction

-continued
DOWN-UP (X—X AXIS)

$$R_1 = R_3 = \frac{Wgc}{2d}$$
$$R_2 = R_4 = \frac{Wg}{2}\left(1 - \frac{c}{d}\right)$$ Forces in XY plane $$R_1 = \frac{Wga}{e}\left(1 - \frac{c}{d}\right)$$
$$R_2 = \frac{Wgac}{de}$$
$$R_3 = -\frac{Wga}{e}\left(1 - \frac{c}{d}\right)$$ Forces in Z-Direction
$$R_4 = -\frac{Wgac}{de}$$

SIDE (Y—Y AXIS)

$$R_1 = R_2 = \frac{Wgb}{2e}$$
$$R_3 = R_4 = \frac{Wg}{2}\left(1 - \frac{b}{e}\right)$$ Forces in XY Plane $$R_1 = \frac{Wgab}{de}$$
$$R_2 = -\frac{Wgab}{de}$$
$$R_3 = \frac{Wga}{d}\left(1 - \frac{b}{e}\right)$$ Forces in Z-Direction
$$R_4 = -\frac{Wga}{d}\left(1 - \frac{b}{e}\right)$$

Forces are then also preferably calculated acting with the weight down in accordance with the following set of equations.

FORWARD-AFT: (Z—Z AXIS)

$$R_1 = \frac{W}{e}\left[\frac{a}{2} - gb\left(1 - \frac{d-c}{d}\right)\right]$$
$$R_2 = \frac{W}{e}\left[\frac{a}{2} - \frac{gb}{d}(d-c)\right]$$
$$R_3 = -W\left[g\left(1 - \frac{d-c}{d}\right)\left(1 - \frac{b}{e}\right) + \frac{a}{2e}\right]$$
$$R_4 = -W\left[\frac{g}{d}(d-c)\left(1 - \frac{b}{e}\right) + \frac{a}{2e}\right]$$

Forces in Z-Direction $$R_1 = R_3 = \frac{WC}{2d}$$
$$R_2 = R_4 = \frac{W}{2}\left(1 - \frac{c}{d}\right)$$ Forces in XY Plane

DOWN-UP: (X—X AXIS)

$$R_1 = \frac{Wga}{a}\left(1 - \frac{c}{d}\right)$$
$$R_2 = \frac{Wgac}{de}$$
$$R_3 = -\frac{Wga}{e}\left(1 - \frac{c}{d}\right)$$ Forces in Z-Direction
$$R_4 = -\frac{Wgac}{de}$$

$$R_1 = R_3 = \frac{WgC}{2d}$$
$$R_2 = R_4 = \frac{Wg}{2}\left(1 - \frac{c}{d}\right)$$ Forces in XY Plane -continued
SIDE-SIDE: (Y—Y AXIS)

$$R_1 = \frac{Wa}{e}\left(\frac{gb - c}{d} + 1\right)$$
$$R_2 = -\frac{Wa}{e}(gb - c)$$
$$R_3 = \frac{Wa}{de}(g(b+e) + c - d)$$ Forces in Z-Direction
$$R_4 = -\frac{Wa}{de}(g(e - b) + c)$$

$$R_1 = \left[\frac{W^2}{4}\left[\left(\frac{gb}{e}\right)^2 + \left(\frac{c}{d}\right)^2\right]\right]^{\frac{1}{2}}$$

$$R_2 = \left[\frac{W^2}{4}\left[\left(1 - \frac{c}{d}\right)^2 + \left(\frac{gb}{e}\right)^2\right]\right]^{\frac{1}{2}}$$

$$R_3 = \left[\frac{W^2}{4}\left[\left(g\left(1 - \frac{b}{e}\right)\right)^2 + \left(\frac{c}{d}\right)^2\right]\right]^{\frac{1}{2}}$$ Forces in XY Plane $$R_4 = \left[\frac{W^2}{4}\left[\left(1 - \frac{c}{d}\right)^2 + \left(g\left(1 - \frac{b}{e}\right)\right)^2\right]\right]^{\frac{1}{2}}$$

After the four mounting reaction points are determined, the dynamic stiffness required for the elastomeric mounting grommets 52, 54, by way of example, is preferably determined in accordance with another set of conventional equations which are as follows:

$$f_n = 3.13 \sqrt{K/W} \quad (1)$$

$$g_o = (2)\sqrt{2} \sqrt{\pi/2(W_1)(T_R)(f_n)} \quad (2)$$

$$g_i = g_o/T_R \quad (3)$$
$$X_i = g_i/.051(f_n)^2 \quad (4)$$

$$f_{n2} = f_{n1} \sqrt{G'_2/G'_1} \quad (5)$$

where:
 $f_n$=HZ
 K=LB/IN
 W=POUNDS
 $W_1$=g²/HZ
 $T_R$=TRANSMISSIBILITY VALVE (DIMENSIONLESS)
 $g_o$=ACCELERATION VALUE (RANDOM) RESPONSE LEVEL
 $g_i$=ACCELERATION VALUE (SINUSOIDAL) INPUT LEVEL
 $X_i$=DISPLACEMENT, INCH D.A.
 $G'_2$=MODULUS, PSI
 $G'_1$=MODULUS, PSI Preferably after this dynamic stiffness is determined, a conventional elastomeric grommet which has this calculated stiffness, such as one available from Lord Kinematics, of Erie, Pa., may be selected without the necessity of having to mold a special grommet although, of course, if this has to be accomplished it may readily be done without departing from the spirit and scope of the present invention. In practicing the presently preferred method of the present invention, the mounting bracket members 56, 56a, 56b and 56c may be mounted on the periphery of the cathode ray tube 20 at the four determined mounting reaction points prior to selecting the appropriate elastomeric grommets or, alternatively, the grommets could be inserted in the mounting bracket members before the mounting bracket members are secured to the periphery of the tube 20. Thus, one approach to practicing the presently preferred method of the present invention is to calculate the four mounting reaction points on the periphery of the cathode ray tube 20 where the minimum bending and torsional stresses occur; then mount the mounting bracket members on the cathode ray tube 20 at these four points by structurally bonding them to the cathode ray tube 20; then place the conventional implosion band 70 on the cathode ray tube 20 to further secure the mounting brackets 56 at these four mounting reaction points, then determine the dynamic stiffness required over a predetermined temperature range to attenuate the dynamic G forces of the selected vibration and shock prone environment; then mount the conventional elastomeric grommets having this calculated dynamic stiffness in the mounting brackets at these four mounting reaction points; and then finally fasten the cathode ray tube 20 to the chassis 22 by threading the fasteners through the grommets at these four points and inserting them in the respective apertures 24, 26, 28 and 30 in the chassis 22.

Thus, the presently preferred mounting arrangement of the present invention preferably employs conventional type of components in a different mounting arrangement which is highly efficient and cost effective in substantially minimizing the bending and torsional forces on the cathode ray tube and the dynamic effects of the G forces on that tube.

What is claimed is:

1. A method of mounting a video type display tube having a periphery in a given dynamic mechanical environment for providing mechanical isolation of said mounted video type display tube comprising the steps of
    mounting a plurality of mounting bracket members on said video type display tube at corresponding predetermined static and dynamic reaction points on said periphery of said video type display tube where substantially minimum bending and torsional stresses occur for said video type display tube in said given dynamic mechanical environment for isolating said video type display tube against dynamic mechanical vibration and dynamic mechanical shock in said given dynamic mechanical environment;
    mounting elastomeric grommets, respectively, in said bracket members, said grommets having a predetermined dynamic stiffness capable of attenuating the associated dynamic G forces of said dynamic mechanical vibration and dynamic mechanical shock in said dynamic mechanical environment over a predetermined temperature range for said environment; and securing said video display tube in an equipment enclosure at said predetermined static and dynamic reaction points by connecting said video type display tube to said equipment enclosure through said mounted elastomeric grommets for providing said mechanical isolation for said mounted video type display tube; whereby said mounted video type display tube ability to withstand dynamic mechanical forces in said given dynamic mechanical vibration and dynamic mechanical shock environment is enhanced.

2. A method in accordance with claim 1 wherein said bracket member mounting step comprises the step of determining at least four of such mounting reaction points.

3. A method in accordance with claim 2 wherein said determining step comprises the step of determining a center of gravity of said video type display tube.

4. A method in accordance with claim 3 wherein said bracket member mounting step further comprises structurally bonding said plurality of bracket members to said video type display tube at said corresponding static and dynamic reaction points.

5. A method in accordance with claim 4 wherein said bracket member mounting step further comprises the step of surrounding said structurally bonded bracket members on the periphery of said video type display tube with an implosion band for securing said mounted bracket members to said video type display tube.

6. A method in accordance with claim 5 wherein said elastomeric grommet mounting step comprises the step of mounting said grommets in said mounted bracket members disposed at said static and dynamic reaction points.

7. A method in accordance with claim 6 wherein said bracket members have apertures therethrough and said grommet mounting step further comprises the step of mounting said grommets in said respective bracket member apertures.

8. A method in accordance with claim 7 wherein said bracket member aperture grommet mounting step further comprises the step of mounting a grommet in each end of the respective bracket member aperture, said mounted grommets having an aperture extending therethrough.

9. A method in accordance with claim 8 wherein said apertures and said video display tube each have a longitudinally extending axis extending in a direction, with said longitudinally extending axis of said apertures extending in the direction of the longitudinal axis of said video display tube.

10. A method in accordance with claim 9 wherein said securing step comprises the step of fastening said video type display tube to said equipment enclosure through said apertures along said longitudinally extending grommet aperture axes at said static and dynamic reaction points.

11. A method in accordance with claim 1 wherein said bracket member mounting step further comprises structurally bonding said plurality of bracket members to said video type display tube at said corresponding static and dynamic reaction points.

12. A method in accordance with claim 11 wherein said bracket member mounting step further comprises the step of surrounding said structurally bonded bracket members on the periphery of said video type display tube with an implosion band for securing said mounted bracket members to said video type display tube.

13. A method in accordance with claim 12 wherein said securing step comprises the step of fastening said video type display tube to said equipment enclosure through said mounted grommets at said static and dynamic reaction points.

14. A method in accordance with claim 13 wherein said elastomeric grommet mounting step comprises the step of mounting said grommets in said mounted bracket members disposed at said static and dynamic reaction points.

15. A method in accordance with claim 14 wherein said bracket members have apertures therethrough and said grommet mounting step further comprises the step of mounting said grommets in said respective bracket member apertures.

16. A method in accordance with claim 1 wherein said securing step comprises the step of fastening said video type display tube to said equipment enclosure through said mounted grommets at said static and dynamic reaction points.

17. A method in accordance with claim 1 wherein said elastomeric grommet mounting step comprises the step of mounting said grommets in said mounted bracket members disposed at said static and dynamic reaction points.

18. A method in accordance with claim 17 wherein said bracket members have apertures therethrough and said grommet mounting step further comprises the step of mounting said grommets in said respective bracket member apertures.

19. A method in accordance with claim 18 wherein said bracket member aperture grommet mounting step further comprises the step of mounting a grommet in each end of the respective bracket member aperture, said mounted grommets having an aperture extending therethrough.

20. A method in accordance with claim 19 wherein said apertures have a longitudinally extending axis in the direction of the longitudinal axis of said video display tube.

21. A method in accordance with claim 20 wherein said securing step comprises the step of fastening said video type display tube to said equipment enclosure through said apertures along said longitudinally extending grommet aperture axes at said static and dynamic reaction points.

22. A method in accordance with claim 1 wherein said video type display tube is a cathode ray tube.

23. In video display tube apparatus comprising a video type display tube having a periphery and an equipment enclosure for mounting said video type display tube for use in a given dynamic mechanical environment for providing mechanical isolation of said mounted video type display tube; the improvement comprising mounting means for mounting said video type display tube in said equipment enclosure in said dynamic mechanical environment wherein said mounting means comprises a plurality of mounting bracket members disposed at corresponding predetermined static and dynamic reaction points on said video type display tube where substantially minimum bending and torsional stresses occur for said video type display tube in said given dynamic mechanical environment for isolating said video type display tube against dynamic mechanical vibration and dynamic mechanical shock in said given dynamic mechanical environment, said bracket members having apertures therein; elastomeric grommets disposed in said bracket member apertures, said grommets having a predetermined dynamic stiffness capable of attenuating the associated dynamic G forces of said dynamic mechanical vibration and dynamic mechanical shock environment over a predetermined temperature range for said environment; and means for securing said video type display tube to said equipment enclosure through said grommets at said predetermined static and dynamic reaction points for providing said mechanical isolation for said mounted video type display tube; whereby said mounted video type display tube ability to withstand dynamic mechanical forces in said given dynamic mechanical vibration and dynamic mechanical shock environment is enhanced.

24. An apparatus in accordance with claim 23 wherein said plurality of bracket members are disposed at at least four of said static and dynamic reaction points.

25. An apparatus in accordance with claim 24 wherein said mounting means further comprises an implosion band surrounding said bracket members for securing said bracket members to said video type display tube.

26. An apparatus in accordance with claim 25 wherein said mounting means further comprises a pair of said elastomeric grommets in said bracket member, one of said pair of grommets being mounted in each end of said bracket member aperture, said grommets having apertures extending therethrough.

27. An apparatus in accordance with claim 26 wherein said grommet apertures have a longitudinally extending axis in the direction of the longitudinal axis of said video display tube.

28. An apparatus in accordance with claim 27 wherein said mounting means further comprises fastening means extending through said apertures along said longitudinally extending grommet aperture axes for fastening said video type display tube to said equipment enclosure at said static and dynamic reaction points.

29. An apparatus in accordance with claim 23 wherien said mounting means further comprises fastening means extending through said apertures through said grommets for fastening said video type display tube to said equipment enclosure at said static and dynamic reaction points.

30. An apparatus in accordance with claim 29 wherein said plurality of bracket members are disposed at at least four of said static and dynamic reaction points.

31. An apparatus in accordance with claim 30 wherein said mounting means further comprises an implosion band surrounding said bracket members for securing said bracket members to said video type display tube.

32. An apparatus in accordance with claim 31 wherein said mounting means further comprises a pair of said elastomeric grommets in said bracket member, one of said pair of grommets being mounted in each end of said bracket member aperture, said grommets having apertures extending therethrough.

33. An apparatus in accordance with claim 29 wherein said mounting means further comprises a pair of said elastomeric grommets in said bracket member, one of said pair of grommets being mounted in each end of said bracket member aperture, said grommets having apertures extending therethrough.

* * * * *

UNITED STATES PATENT AND TRADEMARK OFFICE
CERTIFICATE OF CORRECTION

PATENT NO. : 4,651,218
DATED : March 17, 1987
INVENTOR(S) : Dan J. Fazioli

It is certified that error appears in the above-identified patent and that said Letters Patent is hereby corrected as shown below:

In Fig. 1: The reference numeral labelled "50b" which is next to the numeral "54a" should read --52a--;
In the Abstract, line 21: after "apertures", insert open parenthesis [(]
In column 1, line 33: "arrangemnet" should read --arrangement--;
In column 1, line 38: "arrangments" should read --arrangements--;
In column 1, line 61: "appartus" should read --apparatus--;
In column 2, line 12: before "reaction" insert --static--;
In column 2, line 32: "therefor" should read --therefore--;
In column 2, line 52: "emboidment" should read --embodiment--;
In column 2, line 54: "therefor" should read --therefore--;
In column 3, line 29: "alone" should read --along--;
In column 10, line 36: "wherien" should read --wherein--.

Signed and Sealed this

Twenty-third Day of February, 1988

Attest:

DONALD J. QUIGG

*Attesting Officer*  *Commissioner of Patents and Trademarks*